April 20, 1965     D. H. KELLY     3,178,997
IMAGE-PROCESSING SYSTEM
Filed May 2, 1961     2 Sheets-Sheet 1

DONALD H. KELLY
INVENTOR.

BY

ATTORNEYS.

April 20, 1965 D. H. KELLY 3,178,997
IMAGE-PROCESSING SYSTEM
Filed May 2, 1961 2 Sheets-Sheet 2

DONALD H. KELLY
INVENTOR.

BY *Lyon+Lyon*

ATTORNEYS.

United States Patent Office 3,178,997
Patented Apr. 20, 1965

3,178,997
IMAGE-PROCESSING SYSTEM
Donald H. Kelly, Los Angeles, Calif., assignor to Technicolor Corporation, Hollywood, Calif., a corporation of Maine
Filed May 2, 1961, Ser. No. 107,145
8 Claims. (Cl. 88—24)

This invention relates to the spatial filtering of images and, more particularly, to improvements therein.

The prediction and measurement of the performance of specified image-processing systems has been thoroughly treated in the literature, but the complementary problem of synthesis—that is, the design and construction of image-processing systems to perform any theoretically possible operation—has not been as well developed. In terms of the well-known analogy between an optical system and an electrical network, it is found that for incoherent optical systems, the general synthesis procedure is too limited to be practical. The reason for this limitation can be indicated in various ways. For example, when light waves are detected by eye, film, or photocell, "phase information" is lost, or, expressed otherwise, an optical image is everywhere "non-negative." This restriction, that the optical image must be everywhere non-negative (which obviously does not apply to such variables as voltage and current) normally limits incoherent image modification procedures to "low-pass" filtering effects. Numerous attempts have been made to overcome this lack of "negative light." These have not been completely general, and have been cumbersome, expensive, delicate, and hence restricted to the experimental laboratory.

An object of this invention is the provision of a method and means for achieving the effect of negative light using incoherent optical and photographic processes.

Another object of this invention is the provision of an arrangement for providing a generalized spatial filtering technique, usable with large-area light sources.

Yet another object of this invention is the provision of a novel imaging technique whereby results which heretofore required multiple photographic and optical steps and/or much equipment, are more simply attained.

These and other objects of the invention may be achieved in a system wherein a light image is projected through a spatial filter that in accordance with this invention modulates the spectral range of the projected light image. The light passing through the filter is directed upon a photographic emulsion having the property that the density of the latent image thereon may be reversibly affected by different spectral wavelengths. This sensitized emulsion is of a type which strongly displays the so-called Herschel effect; that is, radiant energy of longer wavelengths than the actinic radiation for a given emulsion can be used to erase the latent image. A recent bibliography is given on this subject in a book entitled, "The Theory of the Photographic Process," by C. E. K. Mees, MacMillan Company, publishers, New York, 1954. Films which display the Herschel effect are commercially purchasable; for example, one sold by the Eastman Kodak Company is known as Kodak Autopositive film. This film is normally used in the graphic arts as a "direct-positive" material. Latent images on this film can be erased by exposing the film to an incandescent light source through a sharp-cutting yellow filter (e.g. Wratten 8). Such a filter takes advantage of the fact that the Herschel sensitivity of this film extends from the green region of the spectrum into the infrared. Blue or ultraviolet light, on the other hand, can be used to expose this film in the normal manner. Note that an exposure which erases the latent image is, in effect, a "negative" exposure.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
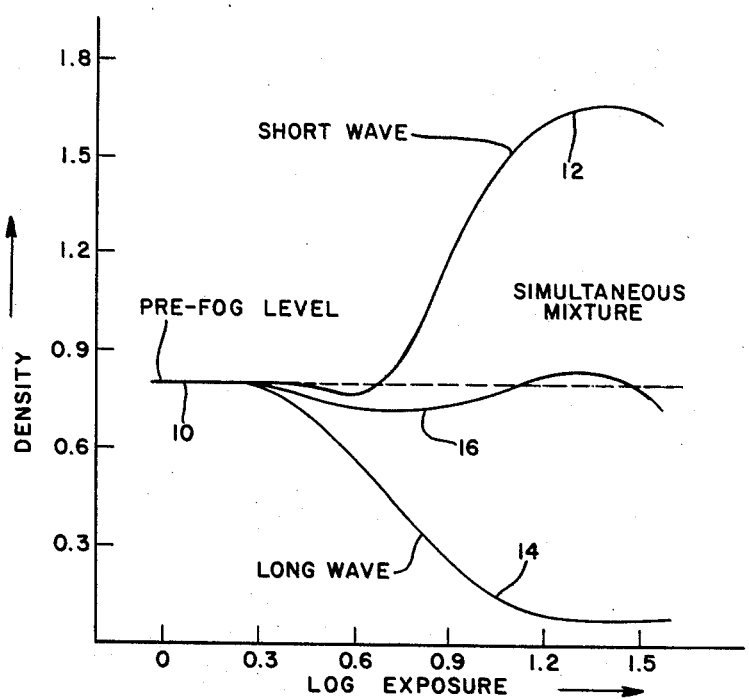
FIGURE 1 is a graph of the characteristic curve of a commercially-available emulsion suitable for use with an embodiment of the invention.

It was previously pointed out that a photographic emulsion which exhibits the Herschel effect can be employed for obtaining, in effect, the result of exposure to negative light. Thus, the "Herschel speed" of unexposed film is obviously zero; a latent image must be present before it can be erased. This means that if such a film is exposed simultaneously to two different images, one in "positive" and the other in "negative" light, the two exposures may cancel each other in some parts of the image and not in others. There are several methods of avoiding this problem. The positive exposure can be made great enough everywhere to give a certain net minimum density. Another method is to pre-expose the film uniformly to a separately adjustable level (like the D.C. bias of a television signal). FIGURE 1 is a graph of density versus the logarithm of exposure for a film having suitable characteristics. The film has been fogged to a certain density level as indicated by the curve 10 in the graph in FIGURE 1, by exposing it to blue light. Upon exposing the film to more blue or short-wavelength light, the portion of the curve 12 is measured, showing a further increase in density. Exposure of the film to yellow or long-wavelength light progressively destroys the latent image and decreases the density resulting upon development of the film, as shown by the portion of the curve 16. Simultaneous mixtures of these wavelengths will affect the density resulting upon development either positively or negatively as represented by the family of curves 12, 14, 16 in FIGURE 1. The resulting density level will be determined by the amounts of short- and long-wavelength light in the mixture.

Figure 2:
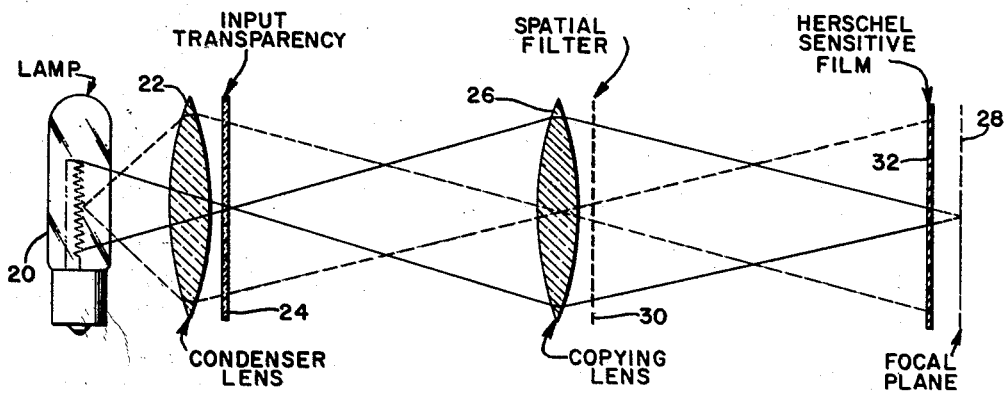
FIGURE 2 is a diagram of on optical printing system in accordance with this invention.

An optical printing system which includes the embodiment of the invention is shown in FIGURE 2. This comprises a source of illumination 20, light from which passes through a condenser lens 22 for being properly directed through a transparency 24, which has thereon the image which is to be modified. If the desired input is a self-luminous image, such as a cathode-ray tube face, then lamp 20 and lens 22 are not needed, and the system of this invention could equally well be called a "camera." The light from the input image is focused by a copying lens 26 upon the plane 28, which is at the focal point of the lens. As close to the copying lens as possible, there is positioned the spatial filter 30, which is made in accordance with the teachings to be shown subsequenty herein. The Herschel-sensitized emulsion 32 is not positioned at the focal plane, but is rather moved away therefrom a distance in accordance with results desired. The reason for this is as follows.

The spatial filter 30 contains regions for altering the color and intensity of the light passing therethrough, in order to achieve the modified image desired at the plane of the Herschel-sensitive film. When the film plane is moved somewhat out of focus, the image of each point on the transparency 24 becomes a miniature version of the lens aperture. By modifying the spatial filter which controls this aperture, the system can thus be given any desired weighting function; i.e., response to a point source. Moving the film away from the focal plane provides a "fine-tuning" adjustment for changing the size of the weighting function, the range of adjustment available depending on the quality of the copying lens. Since this type of spatial filtering depends on geometrical optics, it obviously cannot take full advantage of diffraction-limited lenses; but a well-corrected copying lens permits the film to be moved closer to the plane of best focus before the geometrical approximation breaks down. In any case, large-field aberrations should be avoided, and also chromatic aberration (because of the necessary breadth and separation of the spectral sensitivity bands involved). The image of the lamp filament normally formed at the copying lens of an optical printer may also cause unwanted modulation of the spatial filter, and should be eliminated by using a ribbon filament or a diffusion screen, or by simply moving the filament image slightly during the exposure.

As pointed out previously, one Herschel-sensitive film which has been used with this invention is known as Kodak Autopositive. This film is normally supplied prefogged to its maximum density. The latent image can be erased by exposing the film to an incandescent light source through a sharp-cutting yellow filter, such as the Wratten No. 8. Such a filter takes advantage of the fact that the Herschel-sensitivity of this film extends from the green region of the spectrum into the infrared. However, its Herschel speed is still considerably less than its ordinary actinic speed, so that a conventional density-increasing exposure can be made under these conditions merely by removing the yellow filter. Thus, a spatial filter with variable sign can be constructed for use with this film simply by placing suitable yellow gelatins over the desired negative zones (and, if necessary, adding neutral density to the positive zones) of the lens aperture.

Figure 3:
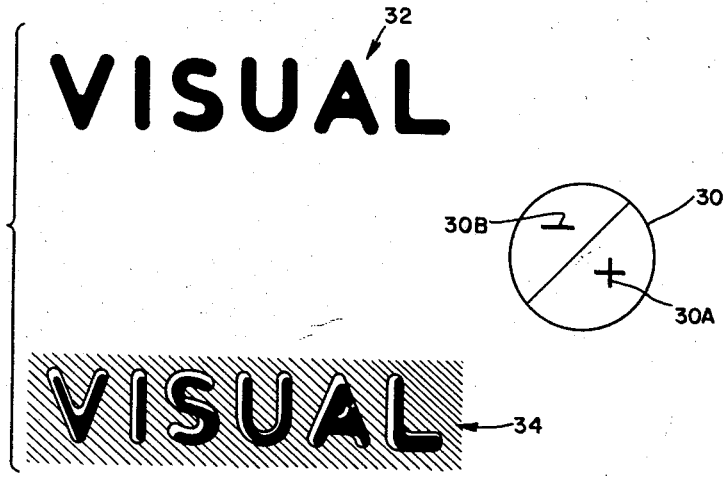
FIGURE 3 illustrates results which may be achieved by employing techniques in accordance with this invention.

FIGURE 3 illustrates some of the results which may be achieved by employing techniques in accordance with this invention. A spatial filter 30 is employed which has two adjacent areas, one positive 30A and one negative 30B. The input transparency 32 merely comprises black lettering on a clear background. The positive part of the filter 30A gives a positive image of the lettering; the negative part of the filter 30B, which is a yellow gelatin of the type indicated above, provides a negative image. The positive part of the filter may be made of appropriate neutral or blue gelatin material or nothing, depending upon the film used, whereas the negative part of the filter may be appropriate yellow, orange, or red gelatin material.

With the filter placed as shown in FIGURE 2 in front of the copying lens and with the sensitive film placed as represented in FIGURE 2, displaced from the focal plane, the results achieved on the developed film 34 are also shown in FIGURE 3. It will be seen that the lettering appears to have a block form, part lighter and part darker than the background. Obviously, a similar result can be obtained by making an ordinary photographic negative of the transparency, sandwiching the negative and transparency together out of registration, and printing from the sandwich. But all these operations have been eliminated and are obtained instead in a single optical printing step. Note that the "negative light," i.e., the long wavelengths transmitted by one portion of the filter, reduces the prefogged level, or density, of the film, whereas the "positive light," i.e., the short wavelengths transmitted by the other portion of the filter, increases the density of the film. The extent of the out-of-registration effect may be controlled by the extent of displacement of the sensitive film from the focal plane.

Figure 4:
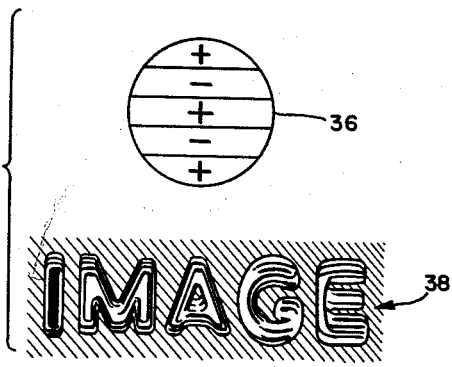
FIGURE 4 shows other results which may be achieved by employing techniques in accordance with this invention.

With more complicated spatial filters, effects which would be impractical to obtain even in multistage photographic operations can be readily produced. Thus, using the configuration of a spatial filter 36, as shown in FIGURE 4, consisting of several alternate positive and negative horizontal bars, the results of printing the transparency of the word "image" are shown at 38. Note that the fine structure of the output is smaller than the input line widths. New type fonts can be designed using the techniques described in accordance with this invention, by varying the positive and negative regions of the spatial filter in order to produce results different from those seen heretofore. The resulting modified images can be employed in a manner well known in the printing art to produce the type font whose image is thus obtained.

Figure 5:
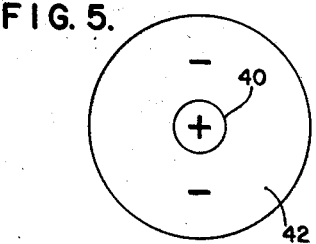
FIGURE 5 is shows a diagram of a simple edge-sharpening filter in accordance with this invention.

Edge sharpening for improved image quality can be obtained by using the technique of spatial filtering described herein. This is analogous to "equalization" in the time-filtering domain. This technique works best on the images obtained from a system whose amplitude response decreases smoothly, rather than abruptly, at high wave numbers (spatial frequencies); for example, a diffraction-limited optical image. In such cases, a spatial filter whose response increases smoothly at high wave numbers can be used to "flatten" the over-all response of the system. The simplest isotropic "edge-sharpening" filter is shown in FIGURE 5 and consists of a positive central disk 40, surrounded by a negative annulus 42. The response of such a filter "peaks" at a certain wave number, which can be controlled by varying the location of the film relative to the position of the focal plane. With this arrangement, the scale of the input must be large enough (relative to the aberrations of the copying lens) so that the form of the weighting function does not break down before the desired equalization is reached.

It has been found that where the chromatic aberration of the copying lens is great enough relative to the Herschel-sensitivity band of film, by positioning the film at a location where it is sharply focussed for blue light, it will be somewhat defocussed for longer wavelengths, giving a weighting function with the desired yellow annulus corresponding to the region 42 in FIGURE 5, even though the spatial filter is not used. Thus, by the expedient of appropriately adjusting the color of the light source, where the copying lens has the proper chromatic aberration, the additional spatial filter may be completely eliminated and edge-sharpening effects still may be achieved. Here, the lens aberration acts as a spatial filter. In any event, whether or not the additional spatial filter is used, it is within the scope of this invention to achieve edge-sharpening by employing a Herschel-sensitive film and exposing it to the appropriate wavelengths with a weighting function as in FIGURE 5, which effectuates sharpening of edges.

A spatial filter may be made photographically, if desired, with the blue-absorbing portions of the filter obtained by depositing a yellow coupler or by imbibition of a yellow dye. Since the direction and magnitude of exposure from a preflashed level depends upon varying mixtures and intensities of blue and yellow light, a spatial filter must modulate both properties. This can be done by constructing the filter of varying densities of the blue-absorbing medium. The variations of the blue-absorbing medium are introduced in the desired locations in accordance with the spatial requirements of the weighting function desired, such as shown in FIGURES 3, 4, 5 and 6, or other variations. Of course, the pattern of the filter must also be the right size to fit the lens of the optical system.

An effect called "automatic dodging" can be obtained by suppressing the response of the system at low wave numbers near zero. Although this operation differs from edge sharpening chiefly by a change in the scale of the weighting function, it can be applied in a quite different way. The automatic dodging technique is normally used in photography as a form of "dynamic" compensation for the extreme tone range of certain inputs, bringing both large dark areas and large light areas into the desired latitude range, without reducing the contrast of finer details in the image.

Figure 6:
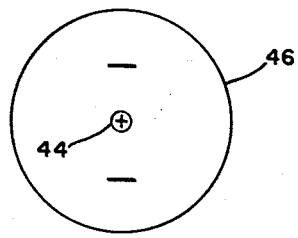
FIGURE 6 is a diagram of a spatial filter for automatic dodging in accordance with this invention.

In accordance with the present invention, the automatic dodging is achieved by making the central positive zone of the "edge-sharpening" spatial filter much smaller, as shown in FIGURE 6 and identified by reference numeral 44, and by moving the film correspondingly farther out of the focal plane. In terms of "unsharp masking" this is equivalent to making the mask more blurred, but here the larger negative area 46 of the spatial filter also reduces the contrast between large areas of the transparency in a desirable way.

Another use of spatial filters deals with the detection of targets amid noisy backgrounds. For example, with a matched filter, that is, one with a weighting function which is identical to the desired target in the absence of noise, it is possible to obtain an output image known as the cross-correlation between the target alone and the target plus noise; this image is brightest at the point where the target is most probably located. Thus, if a transparency which contains background noise and a target with portions both brighter and darker than the background is inserted in the system shown in FIGURE 2 and a spatial filter which matches the target by using both positive and negative weighting is employed, it is possible to obtain an intensification of the image of the target printed upon the Herschel-sensitive film. A further extension of this technique is to substitue a cathode-ray tube face using in a radar system in place of the illuminated transparency. Such an image on the cathode-ray tube face may be more readily seen by photographing it through a suitable spatial filter on Herschel-sensitive film which is displaced properly from the focal plane of a copying lens. The spatial filter will have positive and negative regions thereon, arranged in accordance with the pattern of the target desired to be seen. In this connection, the invention may also be called a camera.

There has accordingly been shown and described herein a method and means of using the photographic Herschel effect to convert optical defocussing into a general image-processing technique, suitable for modifying two-dimensional information in any theoretically realizable way—that is, by smoothing or crispening the images, controlling noise, and detecting targets. Furthermore, in accordance with this invention, a method and means for securing the effect of negative light are provided whereby the design and construction of generalized image-processing systems using large light sources is made possible.

I claim:

1. A photographic printer for producing a modified image of a transparency, said printer comprising a source of light, means for directing light from said source through said transparency, a lens positioned on the side of said transparency away from said light source for forming an optical image of said transparency, a fiilm having the property that exposure to light of a first spectral range increases the density of the latent image on said film and exposure to light of a second spectral range decreases the density of said latent image, said film being positioned to receive light from said lens and in a plane displaced from the plane of said optical image, and means for converting different regions of light which fall on said film and which correspond to different parts of said image to light in said first and second spectral ranges.

2. A photographic printer as recited in claim 1, wherein said means for converting comprises a spatial filter adjacent to said lens which through certain predetermined regions phases only light of said first spectral range and through other predetermined regions passes only light of said second spectral range.

3. A photographic camera for spatial filtering, said camera comprising a lens for forming an optical image of a luminous object, a film having the property that exposure to light of a first spectral range increases the density of the latent image thereon and exposure to light of a second spectral range decreases the density of the latent image thereon, said film being positioned in a plane displaced from the plane of said optical image and to receive light from said lens, and means for converting light from some regions of said luminous object to light in said first spectral range and for converting light from other regions of said luminous object to light in said second spectral range.

4. An optical system comprising an illuminated image emitting light over a wide spectral range including a first and second spectral range, a lens for focussing said illuminated image upon a focal plane, a photographic emulsion positioned displaced from said focal plane to receive the light from said illuminated image passing through said lens, said emulsion having the property that when illuminated with light of said first spectral range the density of the latent image thereon is increased and when illuminated with light of said second spectral range the density of the latent image thereon is decreased, and spatial filter means disposed in the light path between said illuminated image and said photographic emulsion, said spatial filter means having some predetermined regions therein including means for passing only light of said first spectral range and other predetermined regions therein including means for passing only light of said second spectral range for achieving a desired result when said emulsion is developed.

5. An optical system as recited in claim 4 wherein said light of said first spectral range is in the blue region and said light of said second spectral range is in the yellow region.

6. An optical system as recited in claim 4 wherein said illuminated image comprises a desired target hidden within a random background pattern, the form of said spatial filter being predetermined by the form of said desired target.

7. An optical system as recited in claim 6 wherein the form of said spatial filter is the same as the form of said desired target.

8. An optical system as recited in claim 6 wherein the form of said spatial filter is also determined by the statistical properties of said random background pattern.

References Cited in the file of this patent

UNITED STATES PATENTS

| | | |
|---|---|---|
| 2,207,411 | Pierce | July 9, 1940 |
| 2,414,338 | Simmon et al. | Jan. 14, 1947 |
| 2,446,843 | Merritt | Aug. 10, 1948 |
| 2,611,294 | Luboshez | Sept. 23, 1952 |
| 2,857,811 | Naba | Oct. 28, 1958 |
| 2,988,978 | Craig | June 20, 1961 |